(12) United States Patent
Harris et al.

(10) Patent No.: US 12,118,518 B2
(45) Date of Patent: Oct. 15, 2024

(54) METHOD OF CONTROLLING A RECYCLE PROCESS AND A METHOD OF ENABLING RECYCLING

(71) Applicant: METRISK LIMITED, Allerton Bywater (GB)

(72) Inventors: Adrian Nicolas Harris, Allerton Bywater (GB); Alistair James Morelli, Allerton Bywater (GB)

(73) Assignee: Metrisk Limited (GB)

( * ) Notice: Subject to any disclaimer, the term of this patent is extended or adjusted under 35 U.S.C. 154(b) by 319 days.

(21) Appl. No.: 17/464,201

(22) Filed: Sep. 1, 2021

(65) Prior Publication Data

US 2022/0164574 A1    May 26, 2022

(30) Foreign Application Priority Data

Nov. 20, 2020  (GB) .................................... 2018323

(51) Int. Cl.
 *G06Q 10/30*    (2023.01)
(52) U.S. Cl.
 CPC ......... *G06Q 10/30* (2013.01); *G06F 2218/12* (2023.01)

(58) Field of Classification Search
None
See application file for complete search history.

(56) References Cited

U.S. PATENT DOCUMENTS

| 10,825,004 B1 * | 11/2020 | Walker ................. G06Q 20/321 |
| 2008/0296374 A1 | 12/2008 | Gonen et al. |
| 2014/0214505 A1 | 7/2014 | Shuster-Arechiga et al. |
| 2015/0144012 A1 | 5/2015 | Frybarger |

FOREIGN PATENT DOCUMENTS

| KR | 20030085752 A | 11/2003 |
| WO | 2009/021228 A2 | 2/2009 |
| WO | 2019/056102 A1 | 3/2019 |

OTHER PUBLICATIONS

UK IPO Exam Opinion and Search Report dated Apr. 28, 2021, for Application No. GB2018323.2 (2 pgs).

* cited by examiner

*Primary Examiner* — Diane D Mizrahi
(74) *Attorney, Agent, or Firm* — Conley Rose, P.C.

(57) ABSTRACT

The invention provides a method for controlling a recycle process, the method comprising receiving a captured image of an item to be recycled; processing the image to determine if it is a genuine item for recycle; if and only if it is determined to be a genuine article for recycle, storing a record of the item in a user account.

9 Claims, 5 Drawing Sheets

METHOD OF CONTROLLING A RECYCLE PROCESS AND A METHOD OF ENABLING RECYCLING

CROSS-REFERENCE TO RELATED APPLICATIONS

The present application claims priority to application No. GB2018323.2 filed Nov. 20, 2020, and entitled "A Method of Controlling a Recycle Process and A Method of Enabling Recycling", which is incorporated herein in its entirety for all purposes.

FIELD OF THE DISCLOSURE

The present description relates to a method of controlling a recycle process and a method of enabling recycling. In embodiments, the description to a relates to a method of encouraging recycling by provision of rewards.

BACKGROUND

Recycling is an important part of life in the modern world. Historically once a consumable item had been used, the container or package in which it is provided was simply thrown away. However, nowadays, many if not most products that come in some form of packaging are made in the first instance so that the packaging or containers in which they are provided can be recycled. This applies to anything from food products to toiletries, to electronic goods and in fact just about anything that comes in packaging.

A typical example in the area of toiletries is say toothpaste or a shampoo bottle. Shampoo bottles are usually made of a PET type material which is easily recyclable but only if the container once ready for discarding is put in an appropriate place by a user.

Users typically have recycle "bins" at home into which empty or used containers from products can be placed. Typically, different recycle bins are used for different types of product. For example, a user might have one recycle bin for plastic items, one for cardboard, one for metal etc. This can cause complexity on the process of recycling and act as a disincentive to a user to recycle.

In some cases, to address this, combined bins can be provided. When such bins are provided the sorting of the containers formed of different materials is done at a processing centre. Although the use of a combined bin can reduce the administrative burden on a user to recycle, it is still the case that either through inertia, laziness or simply a lack of time or space for a recycle bin, a user will just throw the item away into a conventional refuse bin which will ultimately end up as landfill.

There is, and has been for some time, a drive to reduce or minimise the amount of rubbish that is sent to landfill, i.e. landfill refuse. This is becoming even more important across the world as populations increase and the amount of refuse produced increases accordingly.

Some means of controlling a recycle process is desired that will lead to minimising or a reduction in the production of landfill refuse.

It is known to provide incentive mechanisms to encourage behaviour of certain types. However, it is problem that systems and methods that are designed to provide incentives are often the subject of fraud attempts by users. A system for minimising the risk of fraud is therefore desired.

WO-A-2009/021228 and US-A-2008/296374 disclose a system and method of providing incentive to recycle recyclable materials by providing financial incentives to consumers for recycling at a recycling kiosk. In one embodiment, a method of providing incentive to recycle recyclable materials comprises providing a recycling kiosk having a load determining device for receiving a quantity of recyclable materials from at least a first entity, obtaining identification data associated with the first entity, measuring the quantity of recyclable material received by the recycling kiosk, calculating a reward based on a measurement of the quantity of recyclable material disposed at least proximate to the recycling kiosk by the at least one entity, and associating the reward to the at least one entity.

KR20030085752 discloses a system for managing waste and recycling using a network. Bar code stickers are distributed to residents. The bar code is attached at a waste bag and is read by a bar code reader, and transmitted to a data collection client system. The collected waste data is classified for each resident, and the classified data is transmitted to a data collection server system. The waste data is statistically processed according to a criterion such as recycled waste, incinerated waste or buried waste. All the data processed by the server system is registered for being referred to by a resident or a public servant in charge.

SUMMARY

According to a first aspect of the present description, there is provided a method for controlling a recycle process, the method comprising: receiving a captured image of an item to be recycled; processing the image to determine if it is a genuine item for recycle; if and only if it is determined to be a genuine article for recycle, storing a record of the item in a user account.

The present description provides a system that simply and effectively enables control of a recycle process which can therefore serve to encourage recycling and lead to minimising or a reduction in the production of landfill refuse. Importantly, the method is secure due to the use of an image recognition process so as to avoid the risk that user's will abuse the system and effectively cheat to obtain unfair advantage.

Any system that operates to provide rewards to a user for compliance with a certain process is open to the possibility of fraud by deliberate user action. The present description provides a method and system that minimises the risk of such fraud by the use of image recognition to determine if an article proposed by a user for recycle is a genuine article for recycle or if it is a fake item or perhaps an item that has already been registered and so has therefore already accrued for the user their fair reward.

In one example, the step of processing the image to determine if the item is a genuine item for recycle comprises executing an image matching process on the received captured image. The matching process includes identifying if the image is a duplicate of an already stored image. This is to ensure that the same image cannot be used more than once to provide benefit to a user.

In one example, the image matching process comprises identifying one or more parameters of the item captured in the received image and accessing a stored image database to make a search and comparison therewith. The parameters could for example be one or more of the shape, size, colour, background etc.

In one example, if in the comparison it is identified that some defined parameters match, the image is flagged for later inspection by a second identification process.

In one example, the step of processing the image to determine if the item is a genuine item, comprises: comparing the received image to images stored in a user's account, and if there is not a match identifying it as a genuine item for recycle.

In one example, the step of comparison comprises specifying one or more parameters associated with the image and identifying it as a match with another image if the images share a proportion of identical parameters.

In one example, the proportion is set at between 60 and 80%. In other words, in the case of a shape of an article in an image, the image could be identified as a duplicate if the shape is identical. This might apply in the case of say a crushed container which will have a distinctive shape and so a match of shape in that situation will indicate a likelihood of a duplicate image.

In one example, the method comprises each time an item is accepted, adding a record to the user's account for subsequent processing in a recycle step.

In one example, the method is implemented by an App running on a digital device such as a smart mobile telephone.

According to a second aspect of the present description, there is provided a method of recycling comprising: providing a recycle bin with a unique identifier; upon a user associating themselves with the bin in dependence on the identifier, accessing a user's stored record of items for recycling; prompting a user to capture a picture of an item for recycling and comparing the captured image with all the user's stored items of record; if and only if there is a match, deleting the matched item from the record.

In one example, upon identifying a match, the method operates to update a user's account with a unit of credit.

In one example, the unique identifier is a QR or a bar code.

In one example, the method is arranged to determine the authenticity of the deposit by requiring a user place a selected item for recycle in the bin whilst the QR or bar code is being scanned by the user.

In one example, the QR or bar code is scanned with a mobile telephone and the camera is arranged to capture the image of the QR or bar code whilst depositing an item.

In one example, the method is implemented by an App running on a digital device such as a smart phone.

According to a third aspect of the present description, there is provided a method of enabling recycling, the method comprising: obtaining from a user a record of an item to be recycled; storing the record; upon a user connecting with a recycle location and recycling the item, crediting the user's account.

BRIEF DESCRIPTION OF THE DRAWINGS

Embodiments of the present description will now be described in detail with reference to the accompanying drawings, in which.

DETAILED DESCRIPTION

Examples of the present description provide a method of recycling and a method of enabling recycling. In general, recycle bins are provided each including a unique identifier. A user is registered on a system and once registered, able to deposit items in the recycle bin in such a way as to derive benefit from the process of recycling themselves. As will be explained below, the user, before visiting a particular recycle bin is required to identify products that the user will subsequently attempt to deposit at a recycle bin. In so doing the user is able to derive direct benefit from the process of recycling and in addition, the provision of a benefit functions as an incentive to increase the amount of recycling that individual users will undergo.

In addition, a technical process is provided by which image recognition is performed to ensure that the method described herein is secure and not subject to the risk of fraud which can happen in systems in which incentives are offered. For example, it is not uncommon when a system is set up that provides users with a benefit as an incentive, for the users to exploit loop holes or flaws in the method to obtain rewards and/or incentives which are not truly merited to them. By the method of image processing and image recognition used herein, this is avoided.

In a general sense, a user is required to create a bank of recorded items, which might be packaging items for recycling. When the user is ready to do so, they visit a recycling site and using the present method deposit some or all of the items that they have banked and derive benefit from doing so.

The benefits that can be derived, although not a key part of the present method, include benefits such as direct discounts from various stores or indirect discounts in the form of credit points on a store loyalty card and the like.

Figure 1:
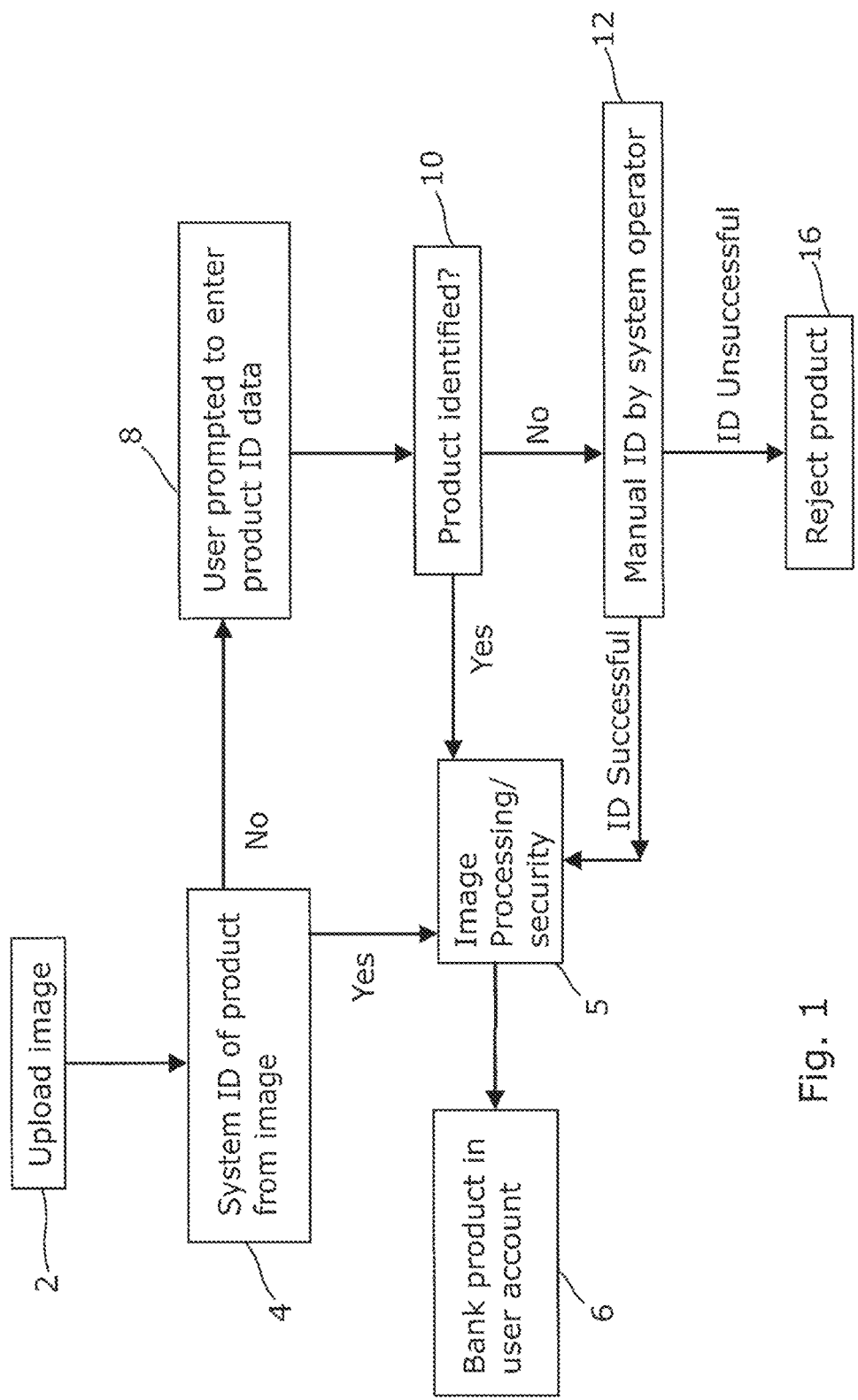
FIG. 1 is a schematic flow chart showing steps in a process of enabling recycling.

With reference to FIG. 1, a first stage of the process will now be described. This is the stage of the process in which a user banks or forms a record of items that they will subsequently attempt to deposit in a recycle bin.

Initially, at step 2, the user uploads an image of the item to be recycled. This can be typically an image that they have captured themselves using an image capture device such as the camera on their mobile telephone.

At step 4, the system performs an identification of the product from the image. This might typically involve reference to an image databank to identify the product in question and confirm that it is recyclable and also to make a record of the product in question for use in a subsequent process of deposit, to be described below.

If it is determined that the product is recognisable and suitable for recycle, the method proceeds to step 5 at which image processing and security is performed on the image. This will be described in detail below, but in summary if it is determined that the image is genuine, i.e. is not an attempted fraud, the process moves on to step 6 at which the product is banked in a user account.

If, based on the image provided by the user at step 2, it is not possible for the system to make an automatic identification of the item, the user is prompted at step 8 to provide data relating to the item. This could be, for example, the brand or type of product or indeed any information that the system can use identify the product in question. It is subsequently determined again at step 10 whether the product can be identified and if it is the product is banked in step 6 as described above. If, after entry of the data by the user at step 8 it is still not possible to identify the product, the image can be forwarded to a system operator for manual identification at step 12. Presuming at this stage that the product is identifiable from the image, the method again proceeds to step 5 at which image processing and security is performed on the image.

At step 10 of the process a product may be identified as one that is hard to recycle. Using a database of the materials making up the product, along with a database of materials that can be recycled by each recycling authority such as a local authority or local council recycling service, a user is instructed which recycling points they may use to dispose of the item in question. Accordingly, items may be identified as requiring particular attention and so filtered to specific recycling channels.

If at this stage it is still determined that the product is not identifiable, or alternatively that it is identifiable but is not suitable for recycling, then the product is rejected at step 16 and the user is required to deal with the product themselves in whatever way they may deem appropriate.

As a result of the process described above, the user will now have produced a store or list of banked products in their account which they can use in due course when it comes to recycling the products. This will be described in greater detail below.

Image processing is performed prior to the step 6 of banking the images. The image processing operates to identify whether or not any attempted fraud is occurring. The image processing that is performed will now be described.

After product recognition or identification at steps 10 or 12 it is determined if the image is an exact duplicate of an image already banked by a user. If it is then the image is rejected. This is because the presence of an exact duplicate will indicate that the user is attempting to bank an image of the same product twice. This can be done by a comparison of the image file with stored image files of items already banked by the user.

In another example the comparison can be done against all the user uploaded images and a selection of stock images defined for or by operators of the system.

If the image is not an exact duplicate the fraud detection process moves onto a subsequent stage in which the resolution of the image being banked is checked. The number of pixels in the image or size of the data file is detected and a check is made as to whether or not the size of data file is outside some predefined threshold. For example, if the resolution is low and the data file therefore small, the image can be identified or flagged likely to have been simply downloaded from an images database online.

If the image is still not rejected at this stage, then a check is made for the shape of the image. That is to say a check is made of the dimensions of the image file and not the shape of the object itself in the image. It has been recognised that images that are downloaded from the internet might typically be of a certain shape. Thus, it is hereby used as a general indicator of likelihood of attempted fraud. If the image is found to have some defined shape it may also be rejected or flagged.

At this stage then each image will have undergone a number of tests to help determine its likelihood of being a genuine image of packaging to be banked. It has been indicated that the images are rejected if they fail one of the tests but in fact instead of being rejected they could simply be flagged or marked as having failed the test in question. In one example, only if an image fails more than one test is it rejected or flagged.

The remaining images will have passed all the tests or thresholds set by the process and so may be marked as genuine images of packaging to be recycled. Such images are therefore stored in a user's list of banked images for subsequent recycling.

Preferably at this stage before actually being banked, images are in addition submitted to a manual check by an operator for final review. It may be that some have been wrongly flagged or marked as potentially fraudulent, when in fact they are genuine. The manual step of checking images is preferably but not essentially provided before the images are banked. It is possible that images are provisionally banked but are then subsequently checked manually and then removed from the list of banked items.

Figure 2:
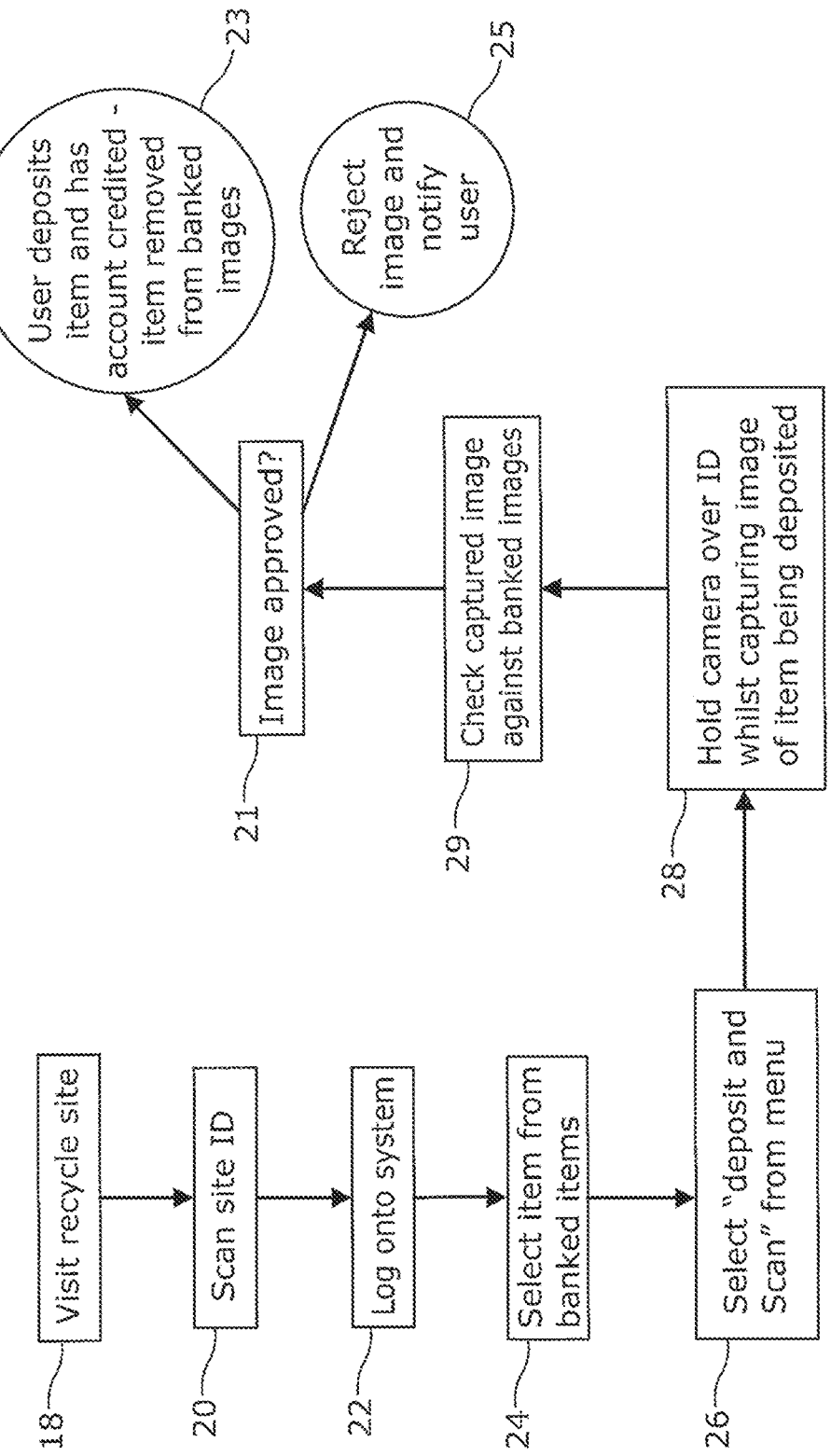
FIG. 2 is a flow chart showing steps in different part of a process for enabling recycling.

Referring now to FIG. 2, the process of recycling the products and the method of present embodiments will be described.

At step 18 a user visits a recycle site. Typically, the recycle site will be a recycle bin within a retail outlet or within a recycling centre. The recycle site could typically simply be a recycle bin provided in, a high street pharmacist.

The recycle site is provided with an identification code such as a barcode, a numerical code or a QR code which identifies the site within the system. The identification of the site can include details of the location, the specific store in which the bin is located and other information. A user scans the site ID at step 20. This could involve a user activating a QR reader on their mobile telephone or using a scan function of a dedicated App for the recycling method.

At step 22, the customer logs into their account, e.g. within the dedicated App for the recycling method, and navigates to their store of banked items. At step 24, the user selects an item from the banked items and selects 26, from a menu, an option to deposit and scan. The user is then required at step 28 to position the camera of their mobile telephone or PDA over the ID of the recycle site, i.e. the QR code, and capture the ID which may be communicated to say the system administration. It is possible, in one embodiment, that images of both the item being deposited and the QR code are captured during deposit.

The user does not actually deposit the item until it receives a confirmation that the images that it has provided are qualifying. Indeed, at step 29, a check is made as to whether the captured image is qualifying. This is a check made against the user's banked items. If the image is approved at step 21 then at that stage the item(s) can be deposited 23 and the user account is credited. If the image is not approved, the image and item are rejected. The user is notified 25 and is advised not deposit the item.

The list of banked items is then updated to remove the item that has been banked and a user receives notification that the successful completion of the banking process has been performed. At this stage, depending on the reward mechanism in use, a user will receive a notification of the reward that they have derived from the process.

Accordingly, the method importantly includes the step of simultaneously scanning a recycle site ID together with an image of an item being recycled. This provides a level of security since it confirms that the user is present at the site at the same time as the article being deposited. This will avoid the risk of defrauding of the system by users.

a. During the step of deposit, of an item it is preferable to ensure that only items corresponding to images that are banked are accepted and capable of deriving credit for a user When a user deposits an article in a bin an image of a scanned QR code is captured. This enables system operators to determine what the QR code is being scanned from, i.e. whether the user is really at the original location of the QR code such as the deposit bin in a store.

As mentioned above, although possible, typically, another image of the product is not captured at deposit and a user must simply indicate in their stored list that the item has been deposited. Thus, the user is only able to gain credit once for each banked item.

a. It is possible, but not preferred that image processing is performed at this stage of the entire process to determine whether or not an item (that can be imaged by a user's camera as a deposit is made) corresponds to an image that has been banked by a user.

Accordingly, an image can be taken as the item is deposited and can then be checked against the banked images. If a match exists the item is accepted and the user derives credit for it. If no match is found then the user does not get credit for the item. Furthermore, once an item is deposited and a user receives credit for it, the stored entry or banked image is removed from the list so that a user cannot deposit the same item for a second time and thereby obtain benefit twice for the same article.

Rewards may be provided via various mechanisms. Typically to qualify for any reward a user or customer will be required to deposit a predefined number of products for a pre-defined reward.

Product categories are established, and inclusions and exclusions are applied depending on the requirement and considerations including:

Targeting specific products

Restrictions on hazardous items

Items that can be recycled through normal recycling channels.

The rewards can be provided via various methods, including, for example, issue of a digital voucher into a user account which in turn can be used a s user desires, e.g. allowing a claim for loyalty points, discounts, or a claim for a physical gift in store. The important point is that by provision of such a system an incentive is provided which in turn encourages use of the recycle scheme and encourages recycling in general.

Figure 3:
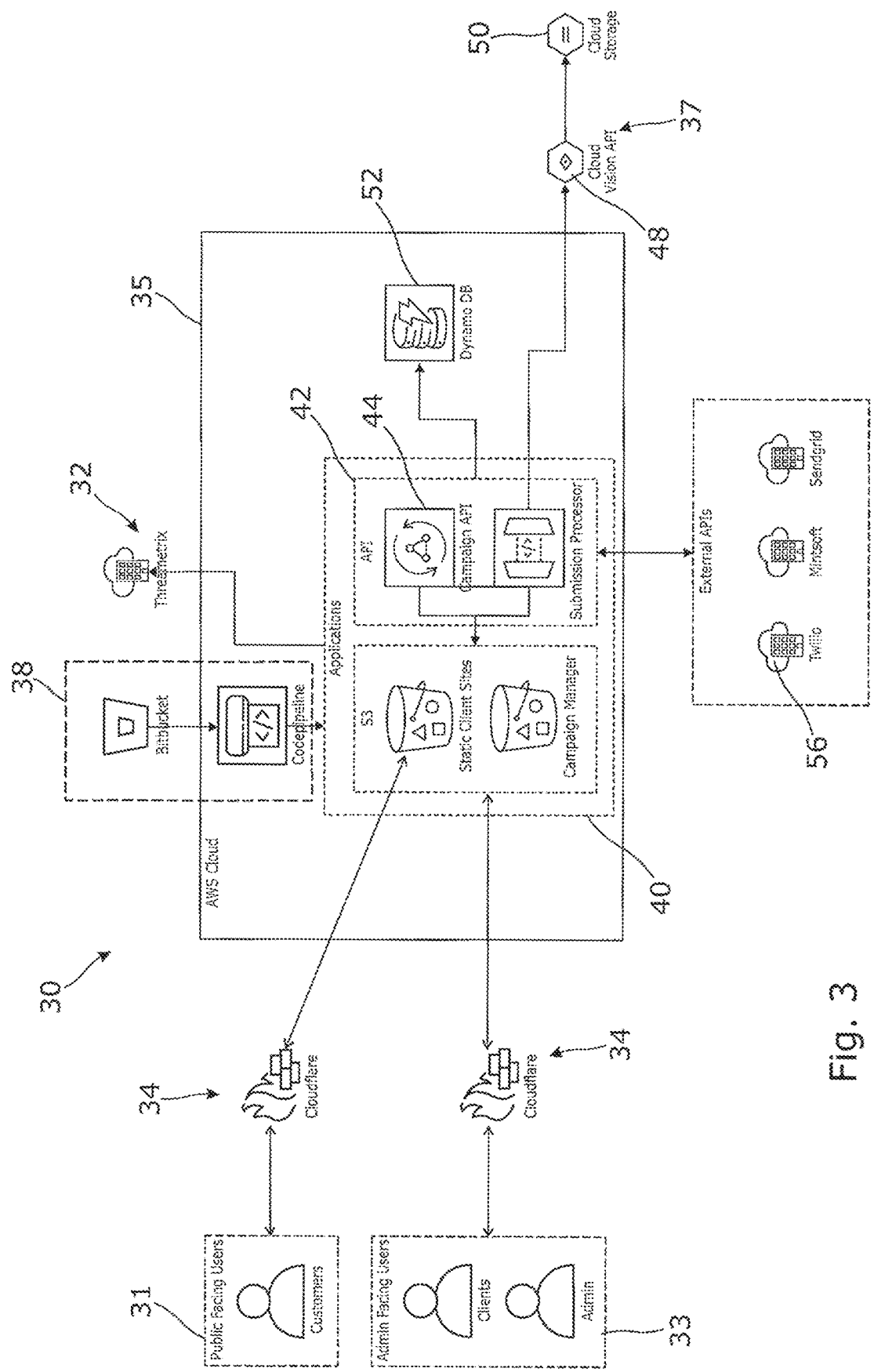
FIG. 3 is a schematic view of a hardware and software platform for providing the method of enabling recycling.

Referring now to FIG. 3, a schematic view of the system architecture is provided, including both hardware and software elements. The system is typically provided in the cloud 30 and is a platform upon which the system and method described herein operates.

End users 31 are able to connect to a first platform 30 typically hosted in the cloud 35. The platform 30 is also shown coupled to a second cloud platform 37 in which storage is provided. It will be appreciated that the first and second platforms could be provided as a single platform but are shown schematically as two at this stage.

A security system 32 coupled to the first platform 30 is provided for fraud prevention and will be described in greater detail below. A security system 32 such as the Threatmatrix system can be used configured and arranged to provide the security in a novel and inventive way as will be described in detail below.

One or more admin users 33 are shown connected to the first platform 30 and have the ability to perform updates and control operations on the system as a whole. Firewalls 34 are provided, in hardware or software, between the users 31 and 33 and the first platform 30 itself. The firewalls 34 are provided as part of system security measures and may be used both during a build or test stage, and in final use and operation of the system. An example of suitable program for use is Cloudflare which can provide for client account routing and general website security.

a. Static client sites 36 are provided with which end users 31 interact in normal use. The static client sites will typically include a user facing login screen and various user interfaces to enable an end-user 31 to interact with the system in the manner described above with reference to, say, FIGS. 1 and 2. A campaign manager 29 is provided which, through APIs in the campaign API centre 42, may be used to manage data in database 52, described in more detail below.

b. A code pipeline is shown schematically at 38 but this is provided and used during build or configuration of the platform and is not typically present or used in normal operation.

A campaign for a user is shown schematically at 40. It is referred to as the client campaign but it will be understood that it might typically be the system that a client sets up to run the system or program of recycling monitoring and rewards that they wish to offer to end users. The campaign 40 is shown as including the static client sites 36 described above and also includes a campaign API centre 42. The campaign API centre 42 includes the campaign API 44 itself together with a submission processor 46. The submission processor 46 is coupled to the storage and processing, or "second", platform 37 referred to above. The submission processor is arranged and configured in use to operate when a user wants to bank an item (an image taken of the product packaging).

The storage and processing platform 37 includes functionality 48, in hardware or software, to read a photograph or image submitted by a user and is arranged and controlled to query a storage database 50 and to execute a match. A link, preferably bi-directional, is provided between the submission processor 27 and the storage and processing platform 37 (e.g. a Google cloud platform may be used as the storage and processing platform 37). This represents the transfer (and retrieval) of information such as whether a product has been identified automatically, and also other data extracted from an image such as brand and other text.

A storage database 52 is provided in which records for end users may be stored, as described above. The database is arranged to store user information such as banked items, deposited items, rewards accrued or given and user details. In addition, the database may store information on the bins and information relating to any recycling campaigns being run.

The database may also be used to store submissions generated when a user deposits an item. This may be considered the promotional/reward side of the system and may be managed through the campaign manager 29.

A number of external APIs 54 are provided coupled to the campaign API centre 42. Any number of external APIs may be used as required for a particular campaign. For example, a text and email message provider 56 can be included. Other external APIs such as Sendgrid® and Mintsoft® may be provided. Sendgrid is an example of a service that can be used to send email. When a user needs to receive communication via email a request is sent to SendGrid with details of the message, which is then picked up and actioned by SendGrid. Such a service helps in the management of mail at large volumes and also provides us with the means to do bulk emails/campaigns. In the present system and method it may be used to send emails to inform a user about the outcome of their deposits.

Mintsoft is an example of a prize fulfilment company. So, if for instance recycling items results in a physical item being sent to the user, rather than a digital reward, an API such as Mintsoft may be utilised to request that a particular prize be delivered to a user if the deposit qualified. Instead of sending physical items it is possible instead to a barcode delivered through an application, wherein the barcode can provide an encoded digital reward.

Overall it will be appreciated that the structure of the platform shown in FIG. 3 is exemplary to indicate how the platform may be constricted to enable operation of the method described herein.

The present method and architecture provides a mechanism for addressing the technical problem of ensuring fraud prevention. The preferred way that this is achieved is with the use of image processing to make determinations as to the existence, or likelihood of fraud being attempted.

A number of steps, some or all of which may be used, are provided to ensure that a user is unable to defraud the present system These include the use of location services, to check where a product is being scanned relative to the address details given in relation to a user's account. A detection for duplicate images is performed in which a determination is made if two images are in fact of different items or if in fact they are duplicates of the same article. In such a case it is clear that user may be attempting to obtain twice the benefit of recycling a single article.

Fraud prevention can also be provided in respect of an entire account rather than in respect of a particular item. This can be achieved by identifying groups of articles that are deposited or attempted to be deposited. Where there is a significant overlap in the group a flag can be raised to indicate a risk of fraud.

Where one user or one account attempts to make an excessive number of daily deposit, a flag can be raised as this may be an indication of fraudulent activity.

A check is also preferably performed to determine if items that are non-qualifying are being deposited. In one example, a determination is made as to whether or not there are multiple users from a common IP address, which can also be an indication of fraudulent activity.

Temporal determinations can also be made. These could include, for example, a determination as to the relative lapse of time between an item being scanned or banked and then deposited immediately.

Finally, a determination can be made as to whether or not accounts legitimately registered to a common address or household are nonetheless attempting to bank or deposit the same items or group of items.

Thus, it can be appreciated that a large number of modes are provided by which fraudulent activity can be detected or suspected.

In the event that such activity is identified the options for action by the operator of the system are varied. It could be that upon one of the items listed above occurring above, a flag is raised which simply indicates to the user that a time block is being instigated before the deposit can be accepted. This can provide time for more in depth analysis of the attempted deposit to be performed.

In another example, identification of some predetermined number of the items listed above can be used as a threshold for blocking an account entirely.

Any possible variation or combination of such responses can be used. In some cases, it might even be that a record is made on the user's account but no actual response that is perceived by the user is actually taken. Thus, the user will continue substantially unaware that their behaviour or activity has given rise to a suspicion of fraud. However, if subsequently another flag is raised or another issue occurs within some determined time period then at that point the user could be notified and the account blocked or time-barred.

It will be appreciated that all the fraud checks described above can be performed substantially automatically, i.e. without direct operator intervention or activity. Of course some may optionally include operator activity, but they can be provided to run automatically upon detection of an attempt by a user to deposit an article.

A number of these fraud detection steps are preferably implemented as part of a platform controlled and organised to provide the required and appropriate levels of fraud detection for use within the present method and system In one example a platforms such as ThreatMatrix (RTM) can be used but others can be used instead. The parameters selected for use in the present system are determined based on an of the method and system to determine the fraud vectors It will be appreciated that there are numerous options and configuration rules that be created in dependence on the fraud risks and the system in question.

In the present system a conditional check is used based on an overarching rule, e.g. "detect when two attributes repeat". Control is then set so repetition is defined as two occurrences within some defined time period. For example, if it is determined that twice in an hour represents a high fraud risk then this is added as an entry and a modifier is assigned to adjust a risk factor accordingly. Likewise, rules can also be set to increase trust.

In the present example, a policy is specified to check specific items such as a user's proximity to a bin when a deposit is made. This then has three levels which are; close proximity (meaning not directly at the bin but in an acceptable distance) −5, further away −15 and even further away −50. Accordingly, if the user is far away from the location of the bin, the deposit will have its trust score reduced dramatically.

A further important factor to check is the number of deposits in a single day where these have a high impact. This is because in practice it would be expected that only deposit per day will be made by a user, particularly if the location of the bin, is say in particular shop. If more than one deposit with the same name, address, email, mobile number or other such ID then it can be impacted −30 or −50 in terms of a trust value.

It is preferred that user patterns are also taken into account in determining thresholds for decisions or for deciding trust values to assign to a transaction or deposit. Furthermore, as the system and method is used more, the volume of data will increase such that user patterns or other data points will become more apparent. In a preferred example, user patterns or other data point are integrated into the fraud policy and updated over time as the data improves and the size of the data set increase.

Figure 4A:
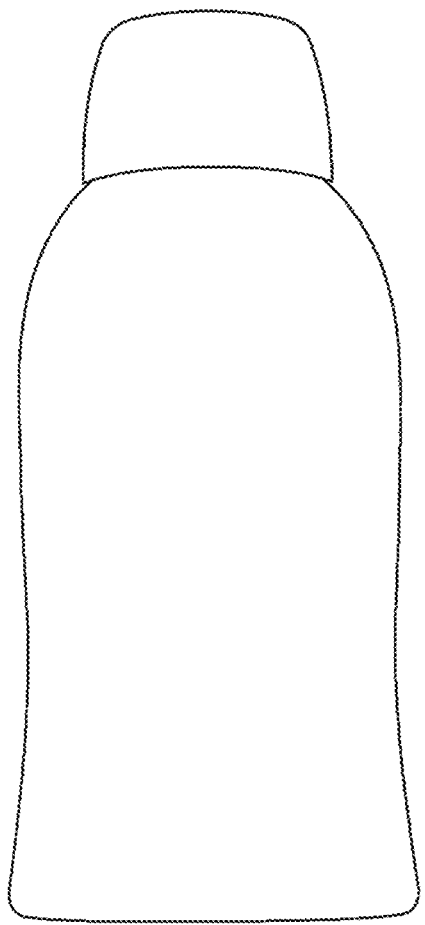
FIGS. 4(A), 4(B), 5(A), and 5(B) show views of images to explain the image recognition processing for use in the method of enabling recycling.
Figure 4B:
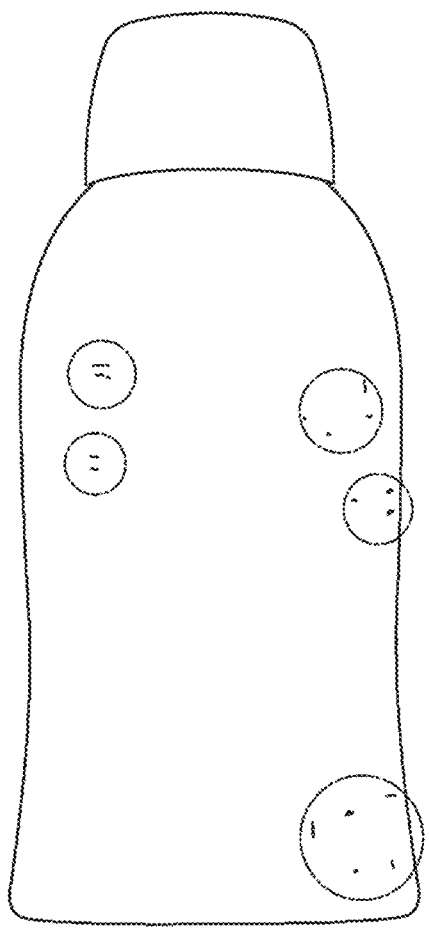

FIGS. 4(A) and (B) shows an example of photographs of two similar products that have been loaded up to the system in the present method (step 2 of FIG. 1). A superficial examination may indicate that the products are the same which would thus give rise a risk of fraud being flagged, or at least a modification to the risk factor. The present systems uses a method of image recognition, as described above that is able to determine differences between the products and reduce the risk of falsely identifying two images as the same item or wrongly not identifying them as the same item. In the example shown, in FIG. 4(B), a number of markings on the product are circled which are not present in the image of FIG. 4(A).

In this case in the right hand image a number of features are circled that distinguish the product from the image on the left. These serve to indicate a low risk that the two images are the same.

A determination can also be made if there are no marks at all on a package that there is a risk of the package being new and not in fact ready for recycling.

Figure 5A:
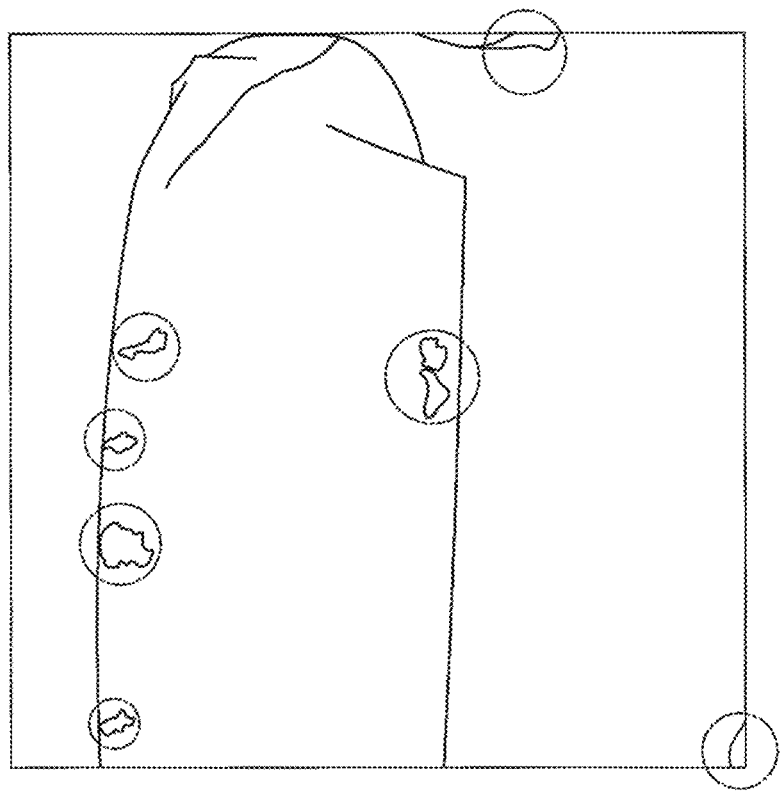
Figure 5B:
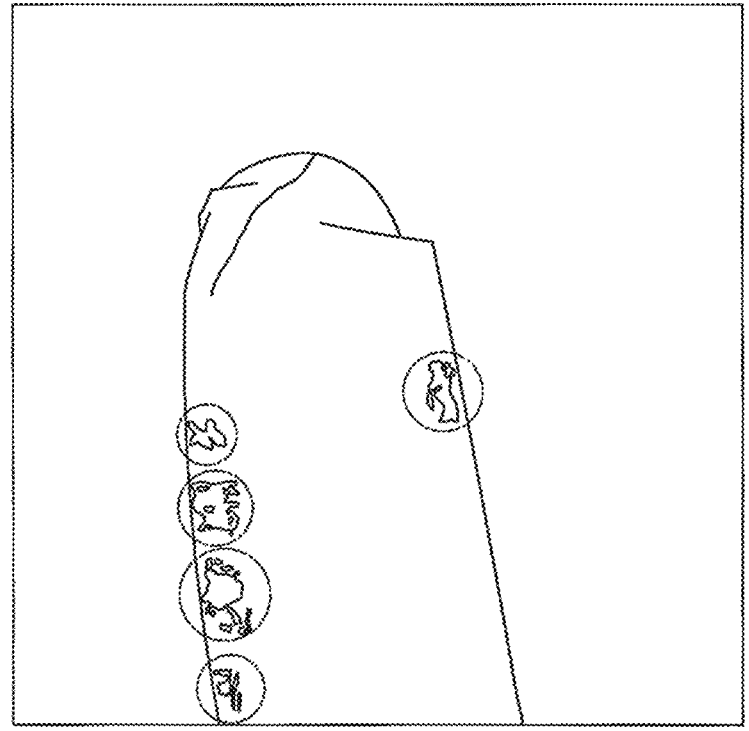

FIGS. 5(A) and 5(B) show a pair of images that are superficially different in that the images are clearly not identical. However, the object shown is in fact the same object and so in a case like this a manual check of the images is preferably performed. The manual process to identify if products are the same or different relies on an analysis of marks produced on an image that identifies markers such as stains, or creases. Each image is reviewed and marked in isolation and the images are then put side by side. The individual markers are checked and importantly it is not the presence of a single marker that is checked but rather the pattern or constellation of points produced by two or more markers. If the markers make a similar pattern and shape, i.e. in two or three dimensions, they are identified as duplicates. If this is at a stage of banking then the second image can be flagged as a likely fraud or simply rejected.

If it is at the stage of depositing the product and the check is against banked items then the image can be accepted as genuine and credit then given to the user.

Embodiments of the present description have been described with particular reference to the examples illustrated. However, it will be appreciated that variations and modifications may be made to the examples described within the scope of the present invention.

What is claimed is:

1. A method for controlling a recycle process, the method comprising:
   receiving a captured image of an item to be recycled;
   processing the image to determine, based on the image, if the item is a genuine item for recycle;
   responsive to a determination that the item is a genuine item for recycle, storing a record of the item in a user account.

2. The method of claim 1, wherein the determination of whether the item is a genuine item for recycle comprises executing an image matching process on the received captured image.

3. The method of claim 2, wherein the image matching process comprises identifying one or more parameters of the item captured in the received image and accessing a stored image database to make a search and comparison therewith.

4. The method of claim 3, further comprising, responsive to identifying, based on the comparison, that some defined parameters match, flagging the image for later inspection by a second identification process.

5. The method of claim 1, wherein processing the image for the determination of whether the item is a genuine item, comprises:
   comparing the received image to images stored in a user's account; and
   responsive to there not being a match, identifying the item as a genuine item for recycle.

6. The method of claim 5, wherein comparing the received image comprises specifying one or more parameters associated with the received image and identifying the image as a match with another image responsive to a determination that the images share a proportion of identical parameters.

7. The method of claim 6, wherein the proportion of identical parameters is between 60 and 80%.

8. The method of claim 1, comprising each time an item is accepted, adding a record to the user's account for subsequent processing in a recycle step.

9. The method of claim 1, wherein the method is implemented by an application running on a digital device such as a smart mobile telephone.

* * * * *